United States Patent
Makino et al.

(10) Patent No.: US 7,352,520 B2
(45) Date of Patent: Apr. 1, 2008

(54) HOLDING DEVICE AND EXPOSURE APPARATUS USING THE SAME

(75) Inventors: Ryota Makino, Utsunomiya (JP); Yukio Takabayashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/624,320

(22) Filed: Jan. 18, 2007

(65) Prior Publication Data
US 2007/0177282 A1 Aug. 2, 2007

(30) Foreign Application Priority Data
Jan. 24, 2006 (JP) ............... 2006-014640

(51) Int. Cl.
*G02B 7/02* (2006.01)

(52) U.S. Cl. .............. 359/819; 359/811; 359/813; 359/821

(58) Field of Classification Search ............. 359/811, 359/813, 814, 815, 819, 821, 822, 843, 847
See application file for complete search history.

(56) References Cited

U.S. PATENT DOCUMENTS

| | | | |
|---|---|---|---|
| 5,187,519 A | 2/1993 | Takabayashi et al. | 355/53 |
| 6,762,826 B2 | 7/2004 | Tsukamoto et al. | 355/72 |
| 6,997,512 B1* | 2/2006 | Yu | 297/344.26 |
| 7,161,750 B2 | 1/2007 | Takabayashi | 359/819 |
| 7,253,975 B2 | 8/2007 | Takabayashi | 359/819 |
| 2005/0078386 A1 | 4/2005 | Takabayashi | |
| 2005/0280799 A1 | 12/2005 | Tanaka et al. | 355/72 |
| 2007/0177282 A1 | 8/2007 | Makino et al. | 359/819 |

FOREIGN PATENT DOCUMENTS

| | | |
|---|---|---|
| JP | 2000-114279 | 4/2000 |
| JP | 2004-078209 | 3/2004 |
| KR | 10-2005-033621 | 4/2005 |
| WO | WO 2004/011984 A2 | 2/2004 |

OTHER PUBLICATIONS

Korean Office Action dated Sep. 27, 2007, issued in corresponding Korean patent application No. 10-2007-0007277.

* cited by examiner

*Primary Examiner*—Timothy Thompson
(74) *Attorney, Agent, or Firm*—Fitzpatrick, Cella, Harper & Scinto

(57) ABSTRACT

A holding device including an object to be held by the holding device and having six first flat surfaces, a holding member having six second flat surfaces each being opposed to and parallel to a corresponding one of the first flat surfaces, wherein the holding member has three holding portions of one of a protruded shape and a recessed shape, and wherein two of the second flat surfaces define at least a portion of the protruded shape or recessed shape of the holding portions, and rolling elements each being provided between associated ones of the first and second flat surfaces. The object is supported by the holding member through the rolling elements.

7 Claims, 9 Drawing Sheets

HOLDING DEVICE AND EXPOSURE APPARATUS USING THE SAME

FIELD OF THE INVENTION AND RELATED ART

This invention relates to a holding device for holding an object with good reproducibility and an exposure apparatus using such a holding device.

A mechanism called a "kinematic mount" is known as a device for holding an object. An advantageous feature of such a kinematic mount is small distortion to be produced in the member held by it. Another advantageous feature is that the member can be demounted and then re-mounted while keeping the positioning precision of the member held by it.

FIG. 9 shows a structural example of such a kinematic mount. The holding mechanism shown at 1A in FIG. 9 comprises a holding member 20A, a subject member 10 to be held by the holding mechanism and including three legs 11, and spherical members 12a, 12b and 12c provided at free ends of the three legs 11, respectively. The holding member 20A is formed with a conical recess 21 and a V-shaped recess 22. By the contact between the conical recess 21 and the spherical member 12a, the subject member 10 is confined with respect to three translational freedoms, without redundancy. Furthermore, by the contact between the V-shaped recess 22 and the spherical member 21b, two rotational freedoms are confined. Finally, by the flat surface of the holding member 20A and the spherical member 12c, one rotational freedom is confined. As a result, the subject member 10 is confined relative to the holding member 20A with respect to translational freedoms in three axial directions, being orthogonal to each other three-dimensionally, as well as three rotational freedoms around these axes, respectively. Namely, the subject member 10 is confined relative to the holding member 20A with respect to six independent freedoms.

FIG. 10 shows another structural example of a kinematic mount. The holding mechanism shown at 1B comprises a holding member 20B formed with three V-shaped recesses 22, and a subject member to be held by the holding mechanism and including three legs 11, and spherical members 12 provided at free ends of the legs, respectively. In this example, as well, the subject member 11 is confined relative to the holding member 20 with respect to six independent freedoms.

Generally, with regard to holding mechanisms 1A and 1B mentioned above, it is said that, even if the holding member 20 is deformed due to a change in temperature environment or to any external force, distortion to be produced thereby in the subject member 10 is small. Furthermore, it is said that, when the subject member 10 is demounted and then re-mounted, it can be disposed with good reproducibility with respect to the holding member 20. Still further, with regard to the holding mechanism B, it is said that, if the holding member 20 or the subject member 10 is expanded or contracted uniformly due to a change in temperature environment, no deviation is produced between central axes of the holding member 20 and the subject member 10.

Japanese Laid-Open Patent Application, Publication No. 2004-78209, shows a holding device that makes good use of the characteristics of a kinematic mount, as described above. The holding device disclosed in this document comprises a holding member having three V-shaped recesses and a subject member having three V-shaped protrusions. Each V-shaped recess is defined by two flat surfaces, each having a spherical portion being protruded from the surface. When the subject member is held by the holding member, the two flat surfaces of each V-shaped recess are opposed to two flat surfaces of the V-shaped protrusion, such that the spherical portions are contacted to the flat surfaces of the V-shaped protrusion. The document mentions that the two spherical surfaces are provided by a rolling mechanism being movable only in a direction along the radial direction of the holding member.

Holding devices such as described above can be incorporated into an exposure apparatus, for example, which is to be used in a lithographic process for production of semiconductor devices, liquid crystal display devices, image pickup devices or thin-film magnetic heads, for example, as a holding system for holding optical elements that constitute a projection optical system, for example. As a matter of course, the holding device can be used also as a device for holding any optical system other than the optical elements of the exposure apparatus, as well as a structure, a workpiece or a subject member to be measured, which require good precision.

When the subject member 10 to be held by the holding mechanism is an optical member that constitutes an optical system of a lithographic exposure apparatus, since recent drastic increases in density of semiconductor devices have forced further miniaturization of patterns, the optical system should have exceedingly high resolution. In order to keep the best optical performance, the surface shape of an optical member determined as the same is produced must be reproduced exactly when it is held by the holding mechanism. In addition to this, after the optical member is held, surface deformation of the optical surface must be minimized.

The inventors of the subject application have made careful investigations about the structures mentioned above, and have found the following.

In the holding mechanism 1A, frictional forces function between the spherical member 12a and the conical recess 21, between the spherical member 12b and the V-shaped recess 22, and between the spherical member 12c and the flat surface. Similarly, in the holding mechanism 1B, frictional forces function at contact points between the spherical members 12 and the V-shaped recesses 22. Hence, deformation of the holding member 20A or 20B resulting from a change in temperature environment or any external force is transmitted through the friction at the contact points and, consequently, it causes deformation of the subject member 10. In order to reduce the effect of friction described above, as much as possible, the surfaces of spherical members, conical recesses and V-shaped recesses have to be processed quite accurately or, alternatively, the surfaces have to be coated with a film of a low frictional material, thereby to reduce the friction coefficient of the contact points. This requires a large increase of production cost.

On the other hand, when the subject member 10 is demounted and then re-mounted, frictional forces similarly function between the spherical members and the conical recesses or V-shaped recesses. As a result, frictional forces, which are attributable to the mounting method, such as the order of contact of the three spherical members or the relative speed upon mounting, would remain in the contact points, causing degradation of reproducibility of distortion to be produced in the subject member 10 when it is mounted.

With regard to the holding device disclosed in Japanese Laid-Open Patent Application, Publication No. 2004-78209, mentioned above, even if the spherical surface being protruded from the V-shaped recess is provided by a rolling mechanism, similar inconveniences mentioned above will be caused in relation to the external force or frictional force in any direction other than the direction along the radial direction of the holding member.

SUMMARY OF THE INVENTION

It is accordingly an object of the present invention to provide a holding device by which distortion to be produced in a subject member, when the same is mounted on a holding member due to any external force of the holding member or to any change in temperature environment, can be reduced significantly, and also, by which good reproducibility of positioning and good reproducibility of initial distortion can be accomplished.

It is another object of the present invention to provide an exposure apparatus having such a holding device.

In accordance with an aspect of the present invention, to achieve at least one of these objects, there is provided a holding device, the improvement comprising an object to be held by the holding device and having six first flat surfaces, a holding member having six second flat surfaces each being opposed to and in parallel to a corresponding one of the first flat surfaces, and rolling elements each being provided between associated ones of the first and second flat surfaces, wherein the object is supported by the holding member through the rolling elements.

In one preferred form of the present invention, the holding device has six holding portions for holding a subject member by a holding member. Each holding portion comprises a first flat surface being provided on the subject member and a second flat surface being provided on the holding member and being opposed to the first flat surface in parallel. There is a rolling member between the first and second flat surfaces, which rolling member is effective to support the first flat surface in parallel to the second flat surface and relatively movably in at least two directions.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
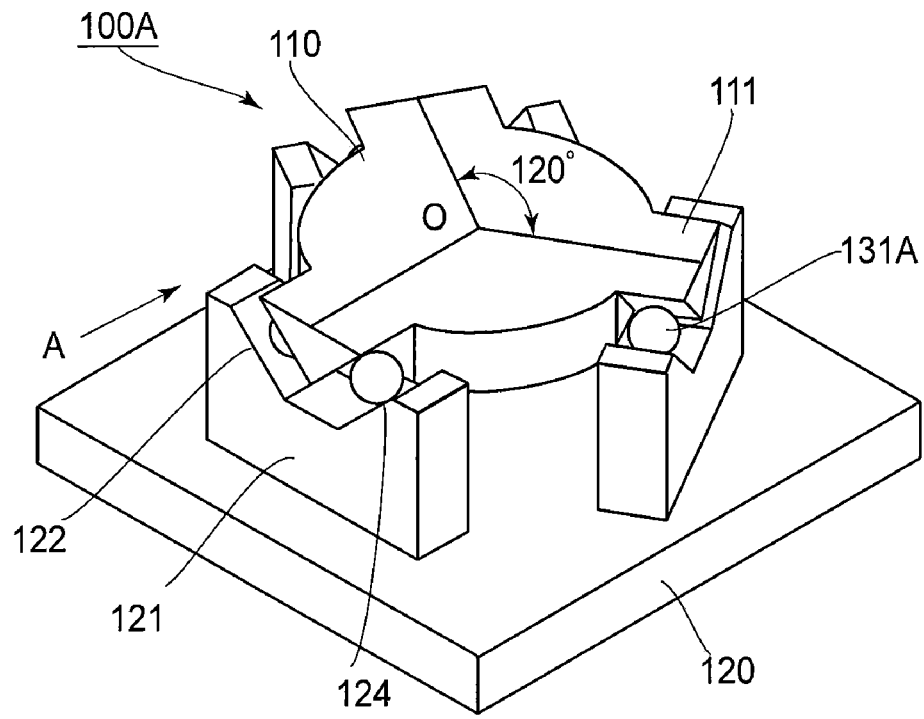
FIGS. 1A and 1B are schematic views, respectively, for explaining the structure of a holding device according to a first embodiment of the present invention.

In a holding device according to one preferred form of the present invention, a first flat surface provided on a subject member to be held and a second flat surface provided on a holding member may be disposed opposed to and in parallel to each other.

The holding device may comprise a holding member having a second flat surface to be opposed to the first flat surface, and a rolling member may be disposed between the first and second flat surfaces. The subject member may be supported through six holding portions.

In the holding device described above, the first flat surface provided on the subject member may include six flat surfaces which are not parallel to each other. These six first or second flat surfaces may be provided disengageably upon the subject member or the holding member, or, alternatively, they may be provided fixedly or integrally on it.

In the six first flat surfaces, when they are provided on the subject member, there may be defined three sets of flat surface groups, each set comprising two independent flat surfaces. Similarly, in the six first flat surfaces, when they are provided on the holding member, there may be defined three sets of flat surface groups, each set comprising two independent flat surfaces. Each flat surface group may provide an approximately V-shaped protrusion or V-shaped recess. Preferably, the two flat surfaces constituting each flat surface group may define an angle of substantially ninety degrees between them. Furthermore, lines of intersection of the two flat surfaces in each of the three flat surface groups, provided on the subject member, may preferably and mutually define an angle of about one hundred twenty degrees. With regard to these intersection lines, two of them may define the same angle with respect to the remaining one intersection line. With regard to the three intersection lines, preferably, extension lines of them may intersect with each other approximately at a single point.

In one preferred form of the present invention, the approximately V-shaped protrusion may be provided on one of the subject member and the holding member, while the approximately V-shaped recess may be provided on the other. When the subject member is going to be held, three approximately V-shaped protrusions and three approximately V-shaped recesses may be placed so that two flat surfaces constituting each V-shaped protrusion and two flat surfaces constituting each V-shaped recess are opposed in parallel to each other, and a rolling element is disposed between the opposed surfaces.

On that occasion, the three V-shaped protrusions or V-shaped recesses may be provided disengageably on the subject member or the holding member, or alternatively, they may be provided fixedly or integrally thereupon.

The three approximately V-shaped protrusions or three approximately V-shaped recesses may have a sectional shape of an approximately ninety-degree V-shape. Furthermore, the three approximately V-shaped protrusions or three approximately V-shaped recesses may have center lines which mutually define an angle of about one hundred twenty degrees. Among the three center lines of the three approximately V-shaped protrusions or three approximately V-shaped recesses, two of them may have the same angle with respect to the remaining one. With regard to the intersection lines of the three approximately V-shaped protrusions or three approximately V-shaped recesses, preferably, extension lines of these intersection lines may intersect with each other approximately at a single point. The rolling member may comprise single or plural balls or, alternatively, it may comprise a plurality of rollers.

Next, some preferred embodiments of the present invention will be described in greater detail, with reference to the attached drawings. However, it should be noted that the present invention is not limited to these forms, and that the structures may be modified appropriately within the scope of the present invention. For example, although, in the embodiments to be described below, the subject member to be held by the holding mechanism is an optical member that constitutes an optical system, the subject member may be a structure, a workpiece or any subject member to be measured, which requires good precision.

First Embodiment

Figure 1B:
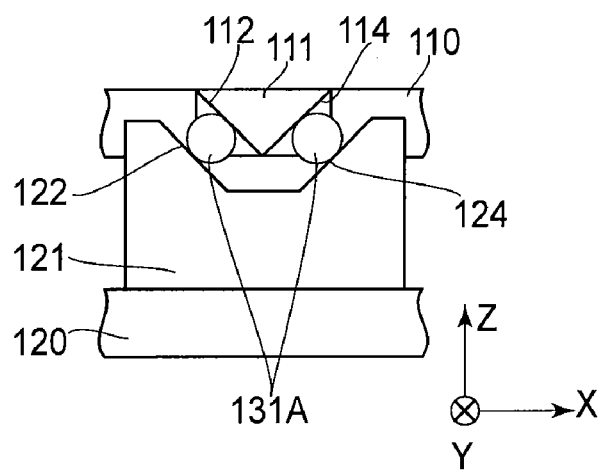

FIGS. 1A and 1B show a holding device 100A according to a first embodiment of the present invention, wherein FIG. 1A illustrates a general structure of the holding device 100A and FIG. 1B is a view as seen in the direction of an arrow A in FIG. 1A.

The holding device 100A is arranged to hold an optical element 110, which is the subject member to be held. The optical element 110 has arms 111 to be held by the holding mechanism and having approximately V-shaped protrusions. Each arm 111 is disposed in a radial direction from the center O of the optical element 110. In this embodiment, three arms 111 are provided approximately at a pitch of one hundred twenty degrees.

On the other hand, there is a holding member that comprises a base 120 and holding portions 121, each having an approximately V-shaped recess. Similarly to the arms 111, the holding portions 121 are disposed in radial directions from the center O and at a pitch of approximately one hundred twenty degrees. Namely, the holding portions 121 and the arms 111 to be held thereby are disposed at positions to be opposed to each other. There are rolling elements 131A disposed between the supporting flat surface 112 (114) of the arm 111 and the supporting flat surface 122 (124) of the supporting portion 121. Each arm 111 is provided disengageably from the optical element 110 or fixedly integrally with it. Similarly, each holding portion 121 is provided disengageably from the base 120 or fixedly integrally with it.

Figure 9:
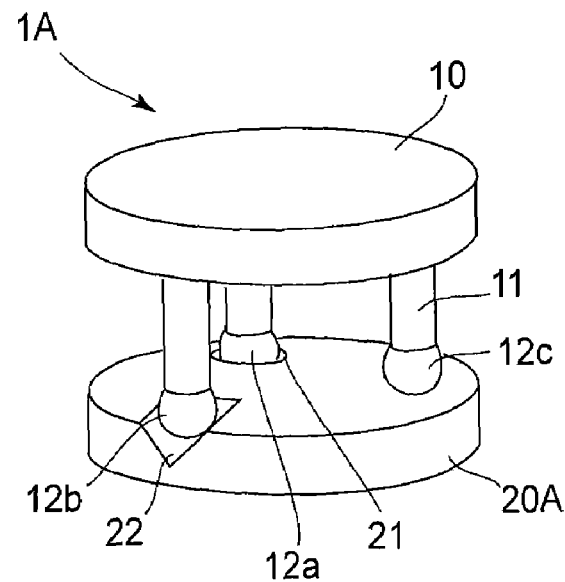
FIG. 9 is a schematic view of a structural example of an ordinary kinematic mount.
Figure 10:
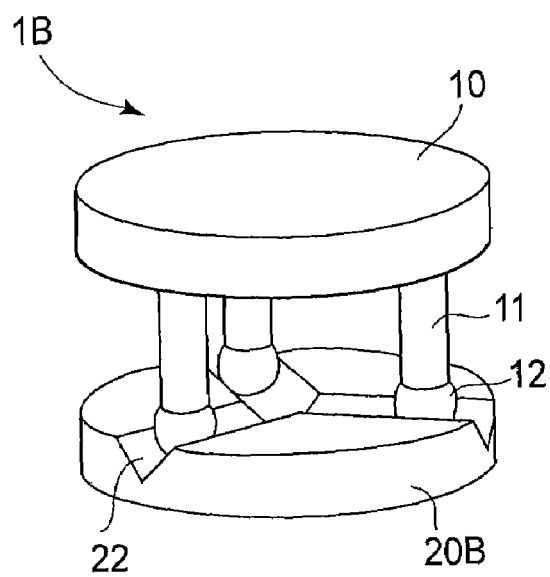
FIG. 10 is a schematic view of another structural example of an ordinary kinematic mount.

As best seen in FIG. 1B, the rolling element 131A of this embodiment comprises a ball element that makes point-contact with the flat surfaces of the arm 111 and the holding portion 121, respectively, thereby to support the optical member 110. The arm 111 is confined relatively to the holding portion through the rolling elements 131A, with respect to two freedoms of X and Z translational components. With regard to the Y translational component and X-, Y- and Z-axis rotational components, it is confined by rolling friction. Generally, in a metal-to-metal relationship, the rolling frictional coefficient is about 1/100 to 1/1000 of the static frictional coefficient. Since the Y translational component and the X-, Y- and Z-axis rotational components are based on rolling, as compared with the point contact without rolling, the confinement is made remarkably low. Thus, as compared with ordinary kinematic mount structures, such as shown in FIGS. 9 and 10, the optical member 110 is held by pure six-freedom confinement, wherein influence of any other components as represented by frictional forces is quite small.

With the structure described above, even if the temperature environment changes to cause thermal expansion of the holding member, such expansion can be released due to the rolling of the rolling member 131A in the Y translational direction. As a result, undesirable influence of thermal expansion of the holding member to the optical member 110 can be well avoided. Similarly, if the holding member deforms locally due to any external force, with respect to the Y translational direction and the X-, Y- and Z-axis rotational directions, the deformation would be absorbed by the rolling. Therefore, undesirable influence of deformation of the holding member 120 to the optical member 110 can be avoided.

Yet similarly, even if the temperature environment changes to cause thermal expansion of the optical element 110, since such expansion is absorbed by the rolling of the rolling element 131A in the Y translational direction, undesirable deformation of the optical element 110 or any positional deviation thereof with respect to the optical axis, which may cause a change in optical performance, can be avoided.

Furthermore, when the optical element 111 is going to be held, the rolling element 131A can roll freely between the opposed surfaces of the arm 111 and the holding portion 121. As a result, only a small frictional force remains there. This ensures improved reproducibility of the distortion (initial distortion distribution) when the optical member 110 is mounted.

The arms 111 and the holding portions 121 are provided at a pitch of about one hundred twenty degrees with respect to the center O of the optical member 110. However, the present invention is not limited to this. Any angles other than one hundred twenty degrees may be used, provided that approximately V-shaped protrusions and approximately V-shaped recesses are provided at mating positions. However, it should be noted that, preferably, two of the three angles defined by the three V-shaped portions are made equal to each other. Furthermore, approximately V-shaped recesses may be provided on the arms 111, while approximately V-shaped protrusions may be provided on the holding portions 121. Similar advantageous results will be obtainable on that occasion.

Second Embodiment

Figure 2A:
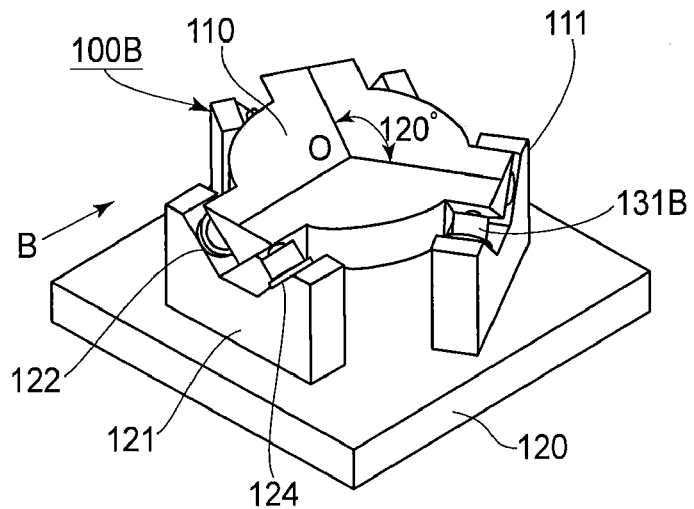
FIGS. 2A, 2B and 2C are schematic views, respectively, for explaining the structure of a holding device according to a second embodiment of the present invention.
Figure 2B:
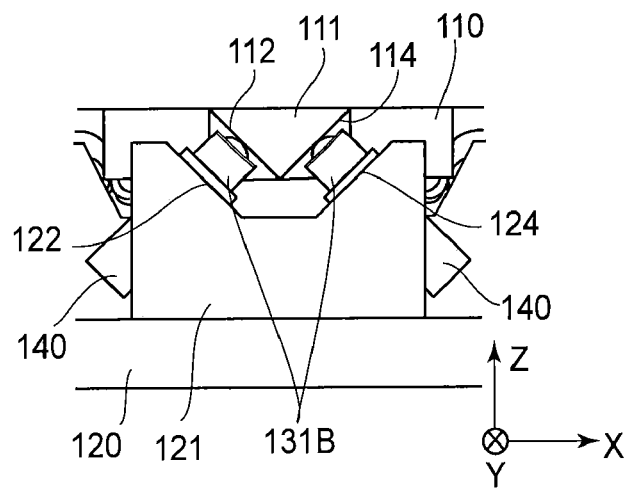
Figure 2C:
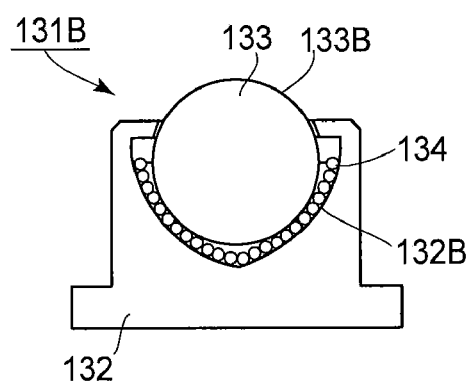

FIGS. 2A, 2B and 2C show a holding device 100B according to a second embodiment of the present invention, wherein the rolling element 131A of the holding device 100A of the first embodiment is replaced by a rolling-element unit 131B that comprises a plurality of balls. FIG. 2A shows a general structure, and FIG. 2B is a view as seen in the direction of an arrow B in FIG. 2A. FIG. 2C shows details of the rolling-element unit 131B. Although in FIGS. 2A and 2B each rolling-element unit 131B is fixedly mounted on the flat surface 122 (124) of the holding portion 121, it may be fixed to the flat surface 112 (114) of the arm 111 to be held by the mechanism.

As best seen in FIG. 2C, the rolling-element unit 131B comprises a member 132 having a spherical recess 132B, a ball element 133, and a plurality of small balls 134. Thus, a large number of small balls 134 are disposed between the spherical recess 132B and the ball element 133, such that the ball element 133 can rotate freely inside the spherical recess 132B. Hence, each arm 111 is confined relatively to the holding portion and through the rolling-element unit 131B, with respect to two freedoms of X and Z translational directions. With regard to the remaining axial components, it is confined by rolling friction.

Generally, in a metal-to-metal relationship, the rolling frictional coefficient is about 1/100 to 1/1000 of the static frictional coefficient. As a result, with regard to the Y translational component and the X-, Y- and Z-axis rotational components, the confinement is made remarkably low.

With the structure described above, similarly to the holding device 100A of the first embodiment, even if the temperature environment changes to cause thermal expansion of the holding member or of the optical element 110, with respect to the Y translational direction, such expansion can be released by the rolling. As a result, undesirable deformation of the optical element 110 or any positional deviation thereof with respect to the optical axis, which may cause a change in optical performance, can be avoided.

Furthermore, the reproducibility of distortion (initial distortion distribution) of the optical element 110, as the same is held by the mechanism, is improved significantly.

Third Embodiment

Figure 3A:
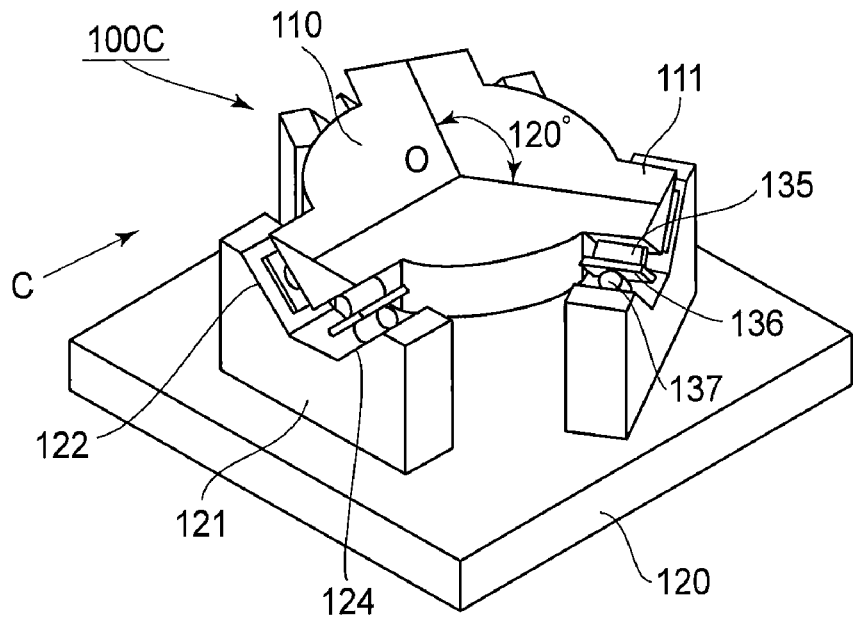
FIGS. 3A and 3B are schematic views, respectively, for explaining the structure of a holding device according to a third embodiment of the present invention.
Figure 3B:
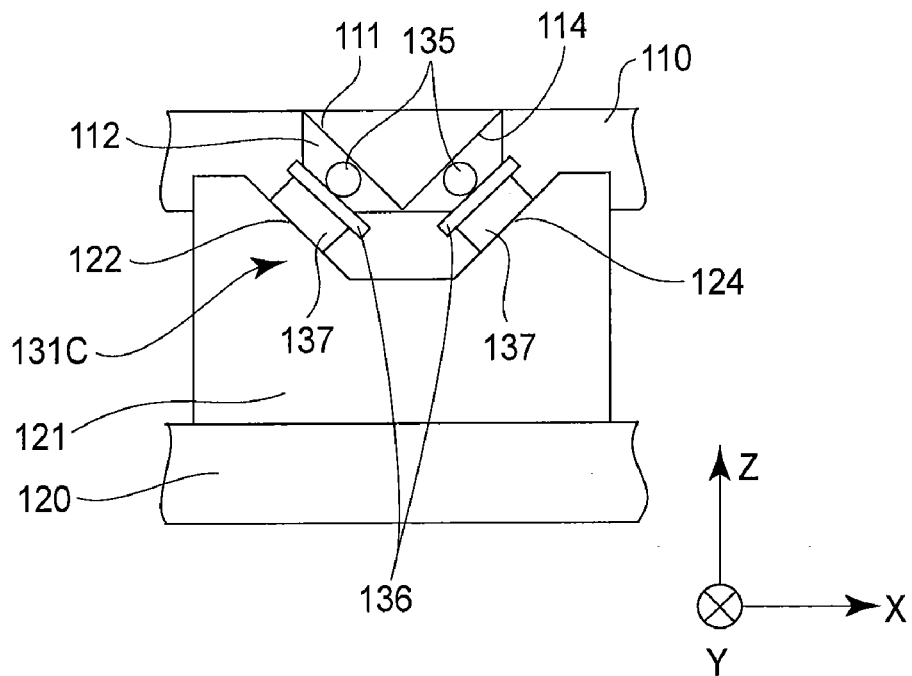

FIGS. 3A and 3B show a holding device 100C according to a third embodiment of the present invention, wherein the rolling element 131A of the holding device 100A of the first embodiment is replaced by rolling-element unit 131C that comprises a pair of orthogonal rollers 135 and 137 and a flat plate 136 disposed between these rollers. FIG. 3A shows a general structure, and FIG. 3B is a view as seen in the direction of an arrow C in FIG. 3A.

Each roller 135 is in line-contact with the flat surface 112 (114) of the arm and with the flat plate 136. Furthermore, each roller 137 is in line-contact with the flat surface 122 (124) of the holding portion and with the flat plate 136. In this manner, the optical element 110 is supported through the rollers. Hence, as compared with the holding portions 101A and IOIB of the preceding embodiments, this embodiment has a feature of higher rigidity holding.

The arm 111 to be held by the mechanism is confined relatively to the holding portion 121 through the rolling-element unit 131C, with respect to two freedoms of X and Z translational components. With regard to the Y translational component and Y rotational component, it is confined by rolling friction. With regard to the X and Z rotational components, there is confinement based on the friction between the roller 135 and the flat plate 136, the supporting flat surface 112 (114), or the friction between the roller 137 and the flat plate 136 and the supporting flat surface 122 (124). This confinement based on the friction is similar to the confinement based on the friction in ordinary kinematic mount structures shown in FIGS. 9 and 10.

With the structure described above, even if the temperature environment changes to cause thermal expansion of the holding member, with respect to the Y translational direction, such expansion of the holding member can be released by the rolling. As a result, adverse influence of thermal expansion of the holding member 120 to the optical element 110 can be well avoided. Furthermore, even if thermal expansion is produced in the optical element 110, since such expansion can be absorbed by the rolling in the Y translational direction, undesirable deformation of the optical element 110 or any positional deviation thereof with respect to the optical axis, which may cause a change in optical performance, can be avoided.

However, if local deformation is produced in the holding member due to any external force, with respect to the X and Z rotational components, there would be transmission of deformation due to the friction. On the other hand, with respect to the Y translational direction and Y-axis rotational direction, deformation can be absorbed by the rolling. Therefore, as compared with the kinematic mount structures shown in FIGS. 9 and 10, transmission of deformation of the holding member to the optical member 110 is reduced significantly.

Furthermore, when the optical element 110 is going to be held, the rolling-element unit 131C can be rolled between the opposed surfaces of the arm 111 and the holding portion 121, except for the Z rotational component. Since the remaining frictional force is reduced through the rolling of the rollers 135 and 137, as compared with the kinematic mount structures shown in FIGS. 9 and 10, the reproducibility of distortion (initial distortion distribution) when the optical member 110 is mounted, is improved.

Figure 4A:
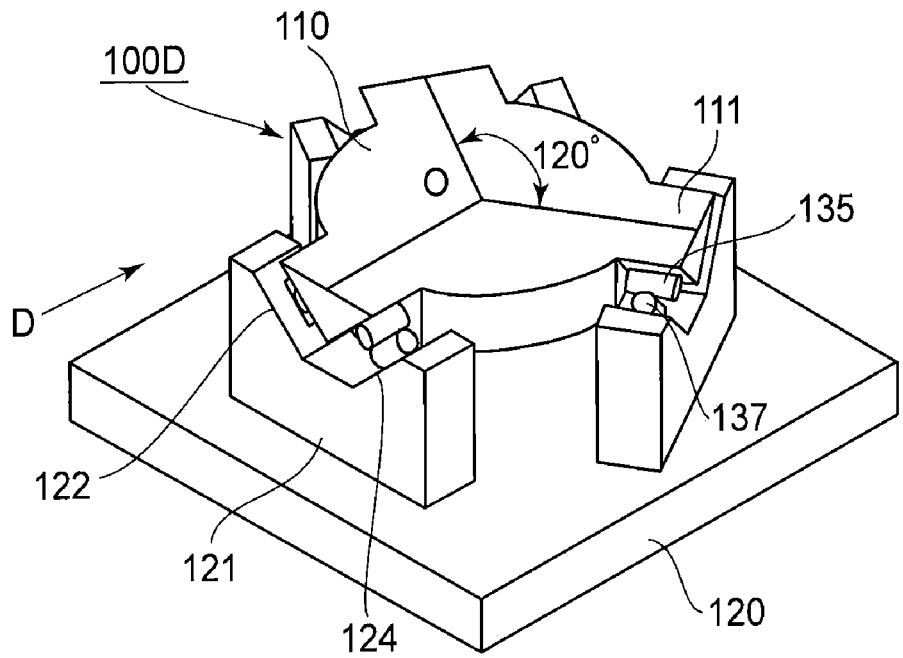
FIGS. 4A and 4B are schematic views, respectively, for explaining the structure of a modified example of a holding device of the embodiment shown in FIGS. 3A and 3B.
Figure 4B:
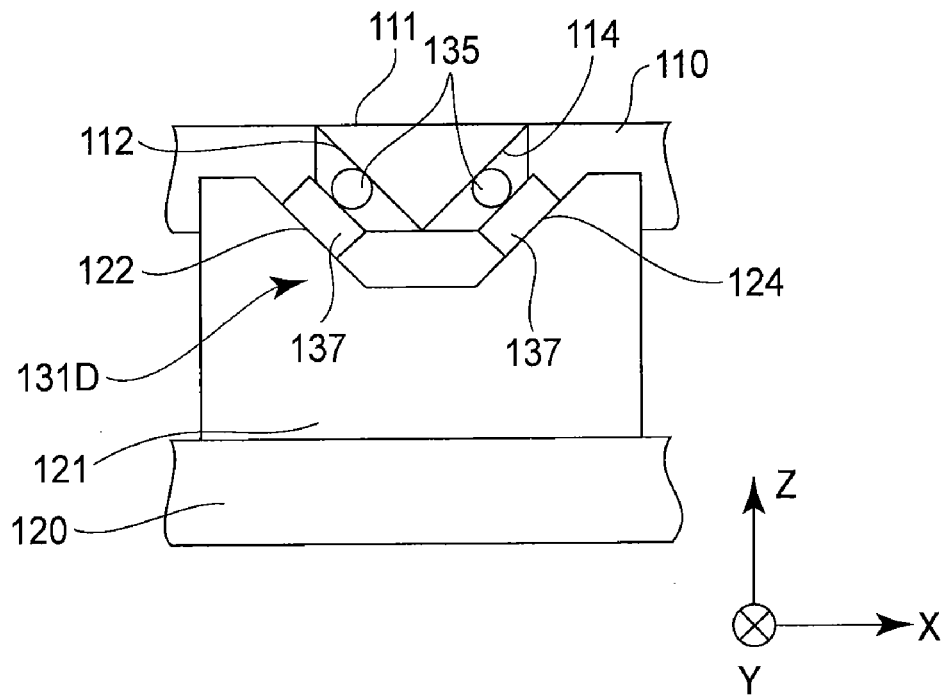

It should be noted here that similar advantageous results are obtainable with a holding device 100D having a rolling-element unit 131D such as shown in FIGS. 4A and 4B, wherein, as compared with the embodiment of FIGS. 3A and 3B, the flat plate 136 between the rollers 135 and 137 is removed.

Fourth Embodiment

Figure 5A:
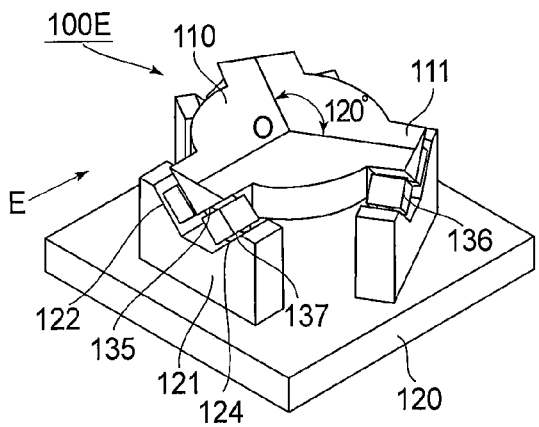
FIGS. 5A, 5B and 5C are schematic views, respectively, for explaining the structure of a holding device according to a fourth embodiment of the present invention.
Figure 5B:
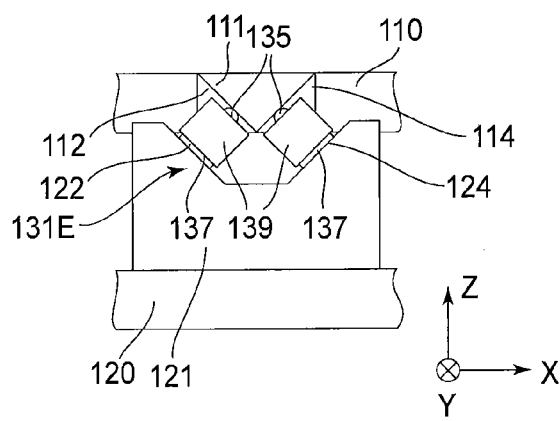
Figure 5C:
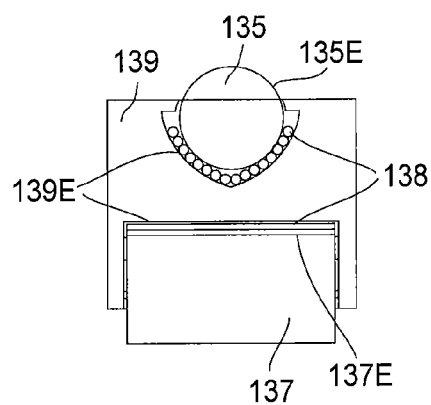

FIGS. 5A, 5B and 5C show a holding device 100E according to a fourth embodiment of the present invention, wherein the rolling-element unit 131C of the holding device 100C of the preceding embodiment is replaced by a rolling-element unit 131E that comprises a pair of orthogonal rollers 135 (137) and a plurality of rollers for supporting them. FIG. 5A shows a general structure, and FIG. 5B is a view as seen in the direction of an arrow E in FIG. 5A. FIG. 5C is a sectional view, showing details of the rolling-element unit 131E.

The rolling-element unit 131E comprises a member 139 having a cylindrical recess 139E, rollers 135 and 137, and a plurality of small rollers 138. Thus, a number of small rollers 138 are disposed between the cylindrical recess 139E and the spherical surface 135E (137E), such that the rollers 135 (137) can be rotated freely inside the cylindrical recess.

Similarly to the holding devices 100C and 100D of FIGS. 3 and 4, the holding device of the FIG. 5 embodiment is arranged so that orthogonal rollers 135 (137) make linear contact with the flat surface 112 (114) of the arm 111 to be held and the flat surface 122 (124) of the holding portion 121, to thereby hold the optical element 110. For this reason, as compared with the holding devices 100A and 100B of the FIGS. 1 and 2, this embodiment has a feature of higher rigidity holding for the arms 111.

In the holding device 100E of this embodiment, the arm 111 is confined relatively to the holding portion 121 through the rolling-element unit 131E, with respect to two freedoms of X and Z translational components. With regard to the Y translational component and Y rotational component, it is confined on the basis of rolling friction. With regard to the X and Z rotational components, there is confinement based on friction between the roller 135 and the supporting flat surface 112 (114) and the friction between the roller 137 and the supporting flat surface 122 (124). This confinement based on the friction is similar to the confinement based on the friction in ordinary kinematic mount structures shown in FIGS. 9 and 10.

With the structure described above, even if the temperature environment changes to cause thermal expansion of the holding member, with respect to the Y translational direction, such expansion of the holding member can be released by the rolling. As a result, adverse influence of thermal expansion of the holding member 120 to the optical element 110 can be well avoided. Furthermore, even if thermal expansion is produced in the optical element 110, since such expansion can be absorbed by the rolling in the Y translational direction, undesirable deformation of the optical element 110 or any positional deviation thereof with respect to the optical axis, which may cause a change in optical performance, can be avoided.

However, if local deformation is produced in the holding member due to any external force, with respect to the X and Z rotational components, there would be transmission of deformation due to the friction. On the other hand, with respect to the Y translational direction and Y-axis rotational direction, deformation can be absorbed by the rolling. Therefore, as compared with the kinematic mount structures shown in FIGS. 9 and 10, transmission of deformation of the holding member to the optical member 110 is reduced significantly.

Furthermore, when the optical element 110 is going to be held, the rolling-element unit 131E is not confined between the opposed surfaces of the arm 111 and the holding portion 121, except for the Z rotational component. Therefore, the remainder of the frictional force is quite small as compared with the kinematic mount structures shown in FIGS. 9 and 10, and the reproducibility of distortion (initial distortion distribution) when the optical member 110 is mounted is improved.

Embodiment of Exposure Apparatus

Next, an example of an exposure apparatus into which a holding system according to the present invention can be incorporated will be explained.

Figure 6:
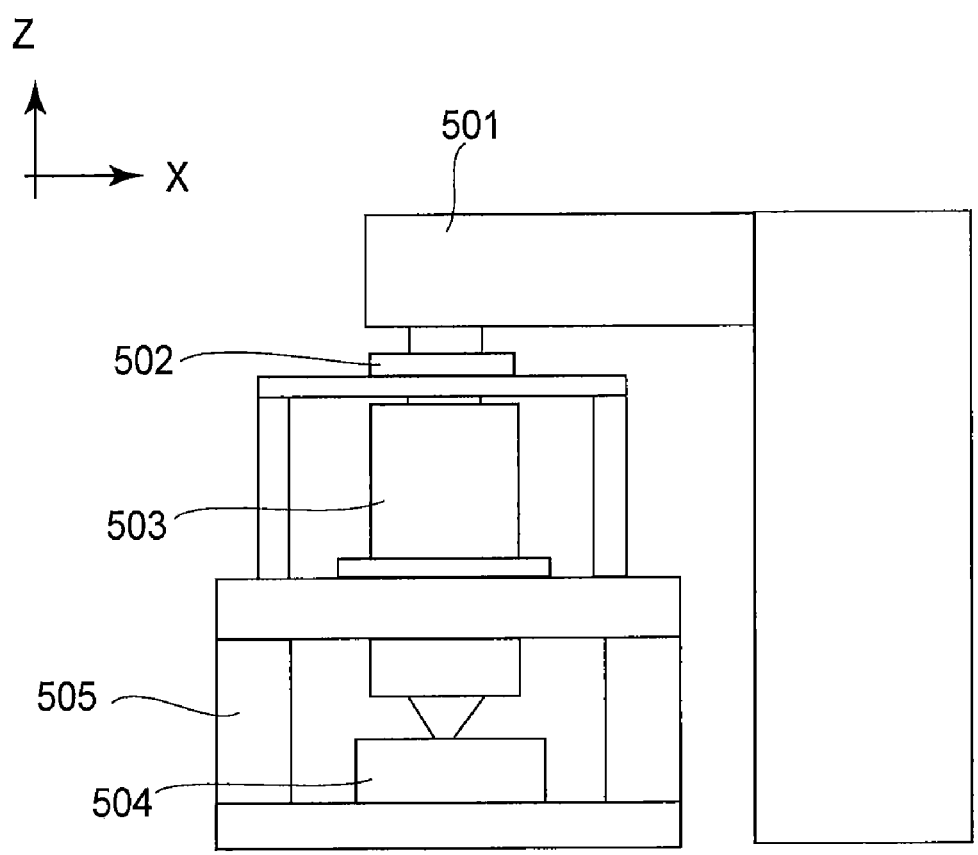
FIG. 6 is a schematic view of an example of an exposure apparatus to which the present invention can be applied.

FIG. 6 shows an exposure apparatus that comprises an illumination system 501, a reticle stage 502 having a reticle placed thereon, a projection optical system 503, and a wafer stage 504 having a wafer placed thereon. This exposure apparatus is arranged to lithographically transfer, by exposure, a circuit pattern formed on the reticle onto the wafer. It may be based on either a step-and-repeat projection exposure method or a step-and-scan projection exposure method.

The illumination system 501 is arranged to illuminate a reticle having a circuit pattern formed thereon, and it comprises a light source unit and an illumination optical system. The light source unit comprises a laser, for example, as a light source. The laser may be an ArF excimer laser having a wavelength of about 193 nm, a KrF excimer laser having a wavelength of about 248 nm, or an $F_2$ excimer laser having a wavelength of about 153 nm, for example. However, it should be noted here that the laser is not limited to excimer lasers. A YAG laser may be used, as an example. Furthermore, the number of lasers to be used is not limited. When a laser or lasers are used as a light source, a beam shaping optical system for shaping parallel light from the laser light source into a desired beam shape, as well as a coherent transforming optical system for transforming a coherent laser beam into an incoherent light beam, may preferably be used.

The light source to be used as the light source unit is not limited to lasers. One or more lamps, such as Hg lamps or xenon lamps, for example, may be used.

The illumination optical system is an optical system for illuminating the mask. It comprises components such as a lens, a mirror, a light integrator, and a stop.

The projection optical system 503 may be provided by an optical system including a plurality of lens elements only, or an optical system including a plurality of lens elements and at least one concave mirror (catadioptric system). Furthermore, it may be provided by an optical system having a plurality of lens elements and at least one diffractive optical element, such as a kinoform, for example, or an optical system comprising all mirror components.

The reticle stage 502 and the wafer stage 504 are movable through linear motors, for example. If the step-and-scan projection exposure method is used, these stages are moved in synchronism with each other. Furthermore, for positioning the reticle pattern with the wafer, at least one of the wafer stage and the reticle stage is provided with an actuator, separately.

The holding system according to the present invention is suitably usable to hold the projection optical system described above. The projection optical system may have a structure in which a barrel having a plurality of lenses may be held or, alternatively, lenses or mirrors are held individually. Furthermore, the holding device according to the present invention may be used to hold any optical system other than the projection optical system, a wafer, a reticle, or a structural member for holding the wafer or reticle.

The exposure apparatus mentioned above can be used to produce various microdevices, such as semiconductor devices (e.g., semiconductor integrated circuits), micromachines, thin-film magnetic heads, for example, having very fine patterns formed thereon.

Embodiment of a Device Manufacturing Method

Next, referring to FIGS. 7 and 8, an embodiment of a device manufacturing method, which uses an exposure apparatus described above, will be explained.

Figure 7:
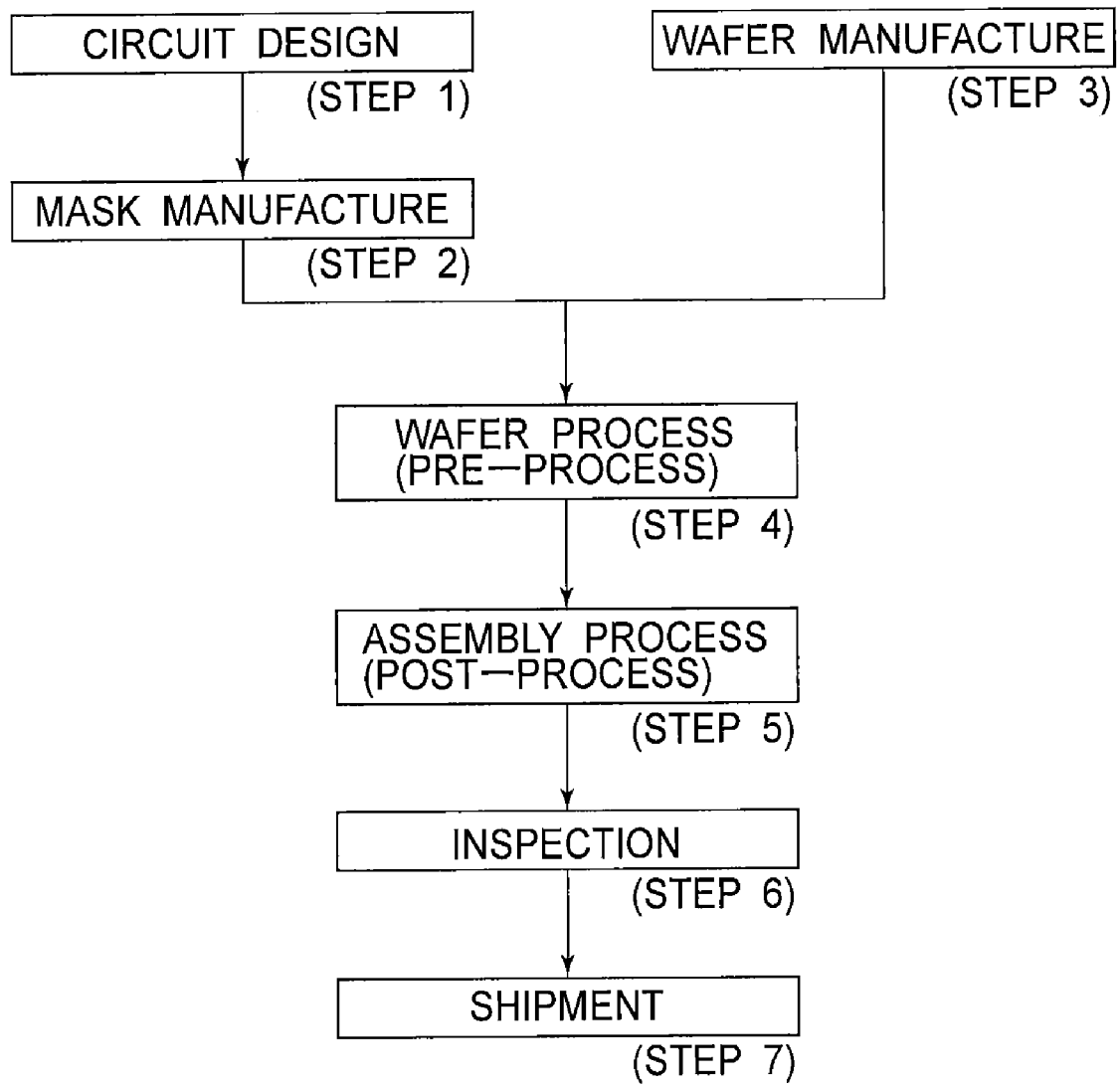
FIG. 7 is a flow chart for explaining the procedure of device manufacture using an exposure apparatus.

FIG. 7 is a flow chart for explaining the procedure of manufacturing various microdevices, such as semiconductor chips (e.g., ICs or LSIs), liquid crystal panels, CCDs, thin film magnetic heads or micro-machines, for example. Step 1 is a design process for designing a circuit of a semiconductor device. Step 2 is a process for making a mask on the basis of the circuit pattern design. Step 3 is a process for preparing a wafer by using a material such as silicon. Step 4 is a wafer process, which is called a pre-process, wherein by using the thus prepared mask and wafer, a circuit is formed on the wafer in practice, in accordance with lithography. Step 5, subsequent to this, is an assembling step, which is called a post-process, wherein the wafer having been processed at step 4 is formed into semiconductor chips. This step includes an assembling (dicing and bonding) process and a packaging (chip sealing) process. Step 6 is an inspection step wherein an operation check, a durability check, and so on, for the semiconductor devices produced by step 5, are carried out. With these processes, semiconductor devices are produced, and they are shipped (step 7).

Figure 8:
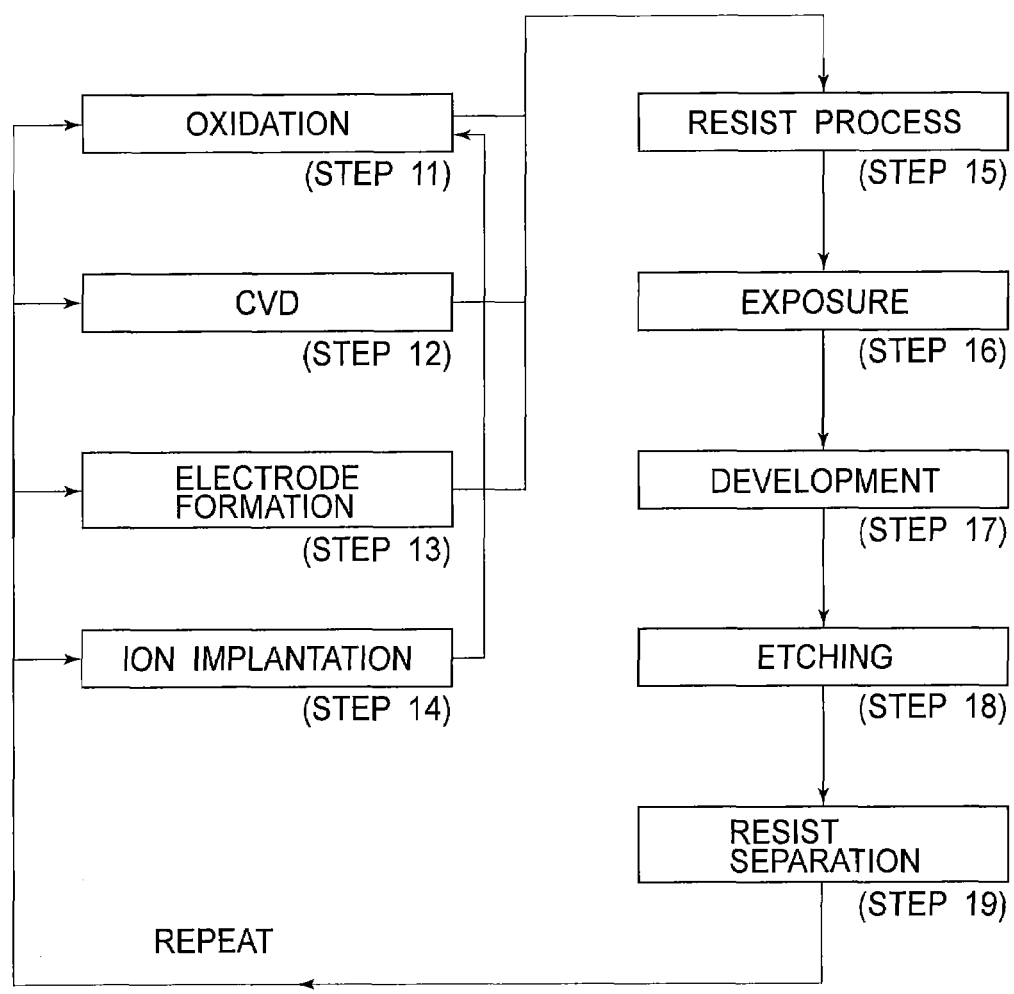
FIG. 8 is a flow chart for explaining details of the wafer process at step 4 in the flow chart of FIG. 7.

FIG. 8 is a flow chart for explaining details of the wafer process. Step 111 is an oxidation process for oxidizing the surface of a wafer. Step 12 is a CVD process for forming an insulating film on the wafer surface. Step 13 is an electrode forming process for forming electrodes upon the wafer by vapor deposition. Step 14 is an ion implanting process for implanting ions to the wafer. Step 15 is a resist process for applying a resist (photosensitive material) to the wafer. Step 16 is an exposure process for printing, by exposure, the circuit pattern of the mask on the wafer through the exposure apparatus described above. Step 17 is a developing process for developing the exposed wafer. Step 18 is an etching process for removing portions other than the developed resist image. Step 19 is a resist separation process for separating the resist material remaining on the wafer after being subjected to the etching process. By repeating these processes, circuit patterns are superposedly formed on the wafer.

With these processes, high density microdevices can be manufactured.

While the invention has been described with reference to the structures disclosed herein, it is not confined to the details set forth and this application is intended to cover such modifications or changes as may come within the purposes of the improvements or the scope of the following claims.

CLAIM OF PRIORITY

This application claims priority from Japanese Patent Application No. 2006-014640 filed Jan. 24, 2006, which is hereby incorporated by reference herein.

What is claimed is:

1. A holding device, comprising:
    an object to be held by said holding device and having six first flat surfaces;
    a holding member having six second flat surfaces each being opposed to and parallel to a corresponding one of said first flat surfaces, wherein said holding member has three holding portions of one of a protruded shape and a recessed shape, and wherein two of said second flat surfaces define at least a portion of the protruded shape or recessed shape of the holding portions; and
    rolling elements each being provided between associated ones of said first and second flat surfaces,
    wherein the object is supported by said holding member through said rolling elements.

2. A holding device according to claim 1, wherein said two of said second flat surfaces mutually define an angle of substantially ninety degrees.

3. A holding device according to claim 1, wherein lines of intersection of said two second flat surfaces at the holding portions mutually define an angle of substantially one hundred twenty degrees.

4. A holding device according to claim 1, wherein, with respect to one of lines of intersection of said two second flat surfaces at the holding portions, the remaining two intersection lines define the same angle.

5. A holding device according to claim 1, wherein extension lines of lines of intersection of said two second flat surfaces at the holding portions intersect with each other approximately at a single point.

6. An exposure apparatus, comprising:
    a holding device as recited in claim 1 for holding an optical element for reflecting light for lithographic exposure.

7. A device manufacturing method, comprising the steps of:
    exposing a substrate by use of an exposure apparatus as recited in claim 6; and
    developing the exposed substrate.

* * * * *